United States Patent [19]

Straka

[11] 4,102,808

[45] Jul. 25, 1978

[54] LATEX FROTHING AGENT

[75] Inventor: Daniel Charles Straka, Sewickley, Pa.

[73] Assignee: Arco Polymers, Inc., Philadelphia, Pa.

[21] Appl. No.: 802,229

[22] Filed: Jun. 1, 1977

Related U.S. Application Data

[62] Division of Ser. No. 728,687, Oct. 1, 1976, Pat. No. 4,049,587.

[51] Int. Cl.$^2$ .................... B01F 17/42; B01F 17/32
[52] U.S. Cl. .................................. 252/354; 252/307; 252/355; 428/95; 428/310; 521/65; 521/88; 521/89; 521/90
[58] Field of Search ................ 252/355, 354, 307

[56] References Cited

U.S. PATENT DOCUMENTS

| | | | |
|---|---|---|---|
| 2,307,047 | 1/1943 | Katzman et al. ................ | 252/354 |
| 3,422,011 | 1/1969 | Jackovitz et al. ............... | 252/307 X |
| 3,577,554 | 5/1971 | Parrish et al. ................... | 260/2.5 L |

*Primary Examiner*—Richard D. Lovering
*Attorney, Agent, or Firm*—John R. Ewbank

[57] ABSTRACT

A cellular elastomeric product is prepared by the curing of a froth prepared by whipping air into an aqueous dispersion of colloidal elastomer, said aqueous dispersion containing a latex frothing agent consisting of an aqueous solution containing about 70% water and about 25% magnesium di(lauryl sulfate), about 2.5% polyalkoxyglycerol having about eight alkoxy groups per hydroxyl and about 2.5% of a quaternary, dihydroimidazole derivative, there being a fatty acid carbon chain attached as the only carbon-carbon linkage for the carbon between the two nitrogens of the imidazole ring, the quaternary nitrogen partaking of the nature of a quaternary sodium glycinate having at such quaternary nitrogen both an alkhydroxy group and said dihydroimidazole ring.

2 Claims, No Drawings

LATEX FROTHING AGENT

This is a division of application Ser. No. 728,687, filed Oct. 1, 1976 which issued Sept. 20, 1977 as U.S. Pat. No. 4,049,587.

BACKGROUND OF INVENTION

1. Field of Invention

This invention relates to cellular macromolecular organic structural material and particularly to the cellular synthetic rubber composition of a type having multiple uses such as carpet backing and to methods of preparing such cellular elastomer by the frothing of an aqueous latex and to frothing agents suitable for the modification of elastomer latex to permit the type of air entrainment involved in froth production.

2. Prior Art

Rubber trees produce an aqueous dispersion of elastomer known as natural latex. At an early date man learned that cellular products could be prepared by whipping air into an aqueous dispersion to prepare a froth which could be dried or otherwise cured into a cellular article.

Frothing agents modifying some of the surface tension relationships affecting the cell structure have been used for many decades in the frothing of latex. Substantially all surfactants have some effectiveness as frothing agents. Ordinary sodium stearate type of soap has been proposed for use as a latex frothing agent. The effectiveness of soap solutions in prolonging the stability of entrainment of air bubbles in aqueous systems is so well known as to be judicial knowledge.

In order to achieve commercially acceptable products, it has generally been necessary to employ a plurality of surfactants. Unfortunately a mixture of surfactants produces a great variety of complications, so that most blends of surfactants are commercially unsatisfactory as frothing agents for the aqueous dispersions of synthetic elastomers presently employed as latex. In some factories the secret know-how relating to the blending of surfactants for the formulation of an acceptable frothing agent was a trade secret which was carefully guarded.

Cellular cushioning is resiliently compressible because of the existence of gas cells throughout the flexible material. To the extent that the walls of each cell have elastic as distinguished from merely flexible characteristics, there is a greater bounce to the cellular plastic. Even a limited amount of elasticity improves the cushioning characteristics of the cellular cushion. It is feasible to have an elastomeric composition containing a significant amount of filler in the elastomer employed in a cellular cushion, even though such filler decreases the maximum stretch attainable by the loaded composition.

In recent years, many carpets have been made by a procedure in which threads are looped through a base to provide a pile fabric for the upperside of the carpet. At the underside of a carpet, the loops are anchored by embedding them in a cellular elastomeric cushion. The precursor for the cellular elastomeric cushion is deposited while the carpet, in an inverted position, is advancing through a coating zone. The precursor for the cellular elastomer cushion is generally a latex froth in which air is dispersed into a composition comprising an aqueous colloidal dispersion of an elastomer, a controlled amount of filler and an appropriate group of modifying agents for enhancing the curing and frothing of the cushion precursor.

In the manufacture of carpet backing using latex froth, it has been customary to utilize calcium carbonate as a filler. Some samples of calcium carbonate contain significant amounts of magnesium carbonate. Heretofore it has been found that frothing agents apparently functioning satisfactorily for the frothing of latex utilizing carbon as a filler were sometimes unsatisfactory when utilizing technical grades of calcium carbonate as fillers.

The tensile strength of the cushioning is of significantly greater importance in the backing for carpeting than for many other applications of cellular elastomeric materials. An important function of the backing is to achieve effective anchoring of the loops. The importance of adequate strength in the anchoring of the loops is about as great as the significance of the cushioning effect. The loading of the elastomer with finely divided calcium carbonate helps to achieve the high tensile strength which has characterized the cellular cushioning employed as carpet backing.

Many types of cellular plastics must be water-proof and vapor-proof and require effective closed cell structure. Carpet backing requires a very open cell structure such that gas can readily permeate from cell to cell. The water content of the latex must be evaporated from the backing while the carpet is passing through the curing oven. The permeation of the steam through the porous inter-connections between the cells is essential for the operability of the process of applying latex froth and curing it into a carpet backing.

Various blends of surfactants have been marketed as frothing agents. Some manufacturers of products, such as carpets, using latex froth have become accustomed to utilizing a selected brand of frothing agent. The market for frothing agents has not been destroyed by the widespread knowledge that a frothing agent was a controlled blend of surfactants. Notwithstanding the continuing research, prior art technologists could not satisfy many of the potential customers for a frothing agent.

SUMMARY OF THE INVENTION

In accordance with the present invention, a frothing agent consists of an aqueous solution containing about 25% magnesium lauryl sulfate and about 2.5% each of a polyalkoxyglcerol having about eight alkoxy groups per hydroxyl group and about 2.5% of a quaternary derivative of dihydroimidazole, the carbon connecting the two nitrogens having as its only carbon-carbon bond a fatty acid carbon chain, the quaternary nitrogen atom partaking of the nature of a quaternary nitrogen of sodium glycinate having at such quaternary nitrogen both an alkhydroxy group and said dihydroimidazole ring.

DETAILED DESCRIPTION OF PREFERRED EMBODIMENTS

The invention is further clarified by reference to a plurality of examples.

EXAMPLE 1

An aqueous colloidal dispersion of a synthetic rubber is prepared by emulsion polymerization of a mixture of butadiene, styrene, unsaturated acid (e.g. methacrylic acid) and an unsaturated amide (e.g. acrylamide). The emulsifying agents, polymerization catalysts and related components are selected to enhance the usefulness of the copolymer as a rubber latex solution.

In a control, the rubber latex is modified to include appropriate vulcanizing agents, sodium oleate as a latex frothing agent, and a minor amount of carbon filler of extremely small particle size. The thus prepared composition is whipped in a cake-beating apparatus to temporarily entrain air into the latex and to form a froth. Such froth is spread as a layer about 6 mm thick and heated at 150° C to cure into a cellular rubber sheet of poor quality. In other controls it is established that calcium carbonate impairs the quality of the cured rubber sheet significantly more than carbon and that relatively large amounts of calcium carbonate especially are particularly troublesome.

By a series of tests it is shown that cellular cushioning for use as carpet backing should desirably contain large amounts of an inorganic filler such as calcium carbonate as a filler, and that sodium oleate is an unsatisfactory latex frothing agent when using large amounts of calcium carbonate filler.

A standard formulation in a series of controls was:

|  | parts by wt. |
|---|---|
| rubber latex solution | 1000 |
| CaCO$_3$ filler | 1680 |
| tap water | 70 |
| polyacrylate thickener | 40 |
| latex frothing agent | 17.0 |

The viscosity of the loaded latex was significantly increased by the polyacrylate thickener. The calcium carbonate filler and tap water were blended into the latex solution containing the frothing agent, whereby the viscosity of the loaded latex was significantly increased.

A sample of the freshly prepared composition was placed in the bottom of a 3 oz. testing cup, and the beater blades were lowered into the liquid. When the beaters were rotated, air was whipped into the mixture, causing the froth to rise to the top of the cup and overflow. The extent of overflow with increased beating provided a measure of the effectiveness of the frothing agent in entraining air at the test conditions. A similar test was conducted for a composition prepared in the same manner, but allowed to age for about 72 hours prior to the frothing test. The interactions amongst surfactants is sometimes slow an unpredictable, so that 72 hour aged compositions sometimes have performance characteristics quite inferior to the results obtained with freshly prepared compositions.

An equalmolar mixture of sodium oleate and sorbitol monostearate is tested as a control frothing agent and found to be unsatisfactory. An equalmolar mixture of naphthalene sodium sulfonate, benzyl trimethyl ammonium bicarbonate, and glycerol monooleate is tested in a control frothing agent and found to be unsatisfactory.

In accordance with the present invention, a frothing agent was prepared consisting of:

|  | parts by weight |
|---|---|
| water | 70.0 |
| Mg(O$_3$SOR)$_2$ in which R is a fatty acid chain | 25.0 |
| H[HC(OCRHCH$_2$)$_8$OH]$_3$H in which R is H or Me | 2.5 |
| 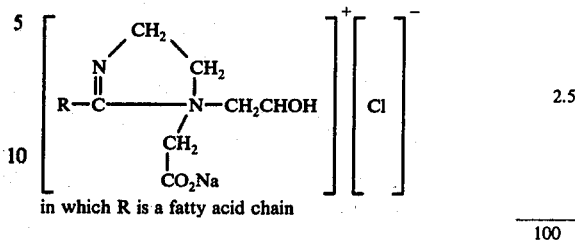 in which R is a fatty acid chain | 2.5 |
|  | 100 |

The magnesium lauryl sulfate is desirably prepared from lauryl alcohol, resulting from the hydrogenation of lauric acid, but alternatively may be prepared from other fatty acids.

The polyalkoxyglycerol polyol desirably has about 24 alkoxy groups, but the number can be within the range from about 20 to about 28 without losing the advantages of the present invention. The polyol is desirably prepared by the reaction of glycerol with ethylene oxide, but reaction products derived from glycerol and propylene oxide or mixtures of ethylene oxide and propylene oxide are also suitable. The dihydroimidazole surfactant can be formed by the condensation of a fatty aldehyde and an ethylene diamine derivative. The fatty acid providing the fatty acid chain is desirably oleic acid, but may be any of the fatty acids derived from coconut oil.

Said frothing agent is employed in a concentration of from about 0.83% to about 1.7% so that on a solvent-free basis (without water), the frothing agent constitutes from about 0.25% to about 1.0% of the dry elastomer solids content of the latex employed in the composition. Desirably the surfactant concentration (dry basis) is about 96% of the elastomer (dry basis) content of the latex.

The 3 oz. cup containing the liquid latex modified by said frothing agent is repositioned into the zone of resting beaters. Air is entrained in the composition when the beaters are rotated.

The viscosity of the loaded latex is about 15,500 centipoise. The weight of the composition initially used in such 3 oz. cup is 147 g, but after whipping air into the latex for a minute, the froth remaining in the cup after skimming off the froth above the lip of the cup weighed only 110.8 g. Moreover, further whipping of the froth and skimming off the excess provided a measurement of only 66.8 g for 3 ounces of froth after three minutes of air entrainment. The residual froth weighed only 48.0 grams after five minutes of whipping. Another sample in the 3 oz. cup was whipped for one minute and allowed to sit overnight to permit the excess froth above the cup to drain away. After such overnight aging, the froth remaining in the cup (without skimming) weighed 57.3 g, thus indicating that the froth had advantageous stability. The overnight aging was in a jar in which the humidity was high.

Such data established the frothing agent was effective for the frothing of loaded latex for carpet backing. Such effectiveness was confirmed in factory production of carpet backing using the advantageous frothing agent of the present invention.

In the practical utilization of the three surfactant frothing agents, outstandingly superior results have been achieved as regards uniformity of results notwithstanding differences in source of the calcium carbonate filler. Previous frothing agents have been troublesome because of baffling differences in performance attributable to different supplies of calcium carbonate. Although calcium carbonate and magnesium carbonate are generally deemed insoluble in water, the finely divided calcium carbonate may permit the solubilization of sufficient magnesium ion (derived from the magnesium carbonate impurity in the calcium carbonate) to interfere with surfactant performance. Because the frothing agent of the present invention is predominantly the magnesium salt of an acid which is the half ester of a fatty alcohol (derived from a fatty acid such as lauric acid) and sulfuric acid, the magnesium content of the calcium carbonate, whether high or low, readily or difficultly leachable, does not impair the performance of the frothing agent.

Cellular plastic can be manufactured to feature large cells resembling the structure of a sponge, and such large cell structure is desirable when liquid absorptivity rates are important. For carpet backing, however, the desiderata are cost, tensile strength, and cushioning resiliency. Extremely small cell size, desirably even smaller than conspicuous to the eye, while still retaining the permeability of steam through each cell wall during curing of the cellular elastomer, is the desirable feature of carpet backing. Both the polyether glycerol and the fatty acid dihydroimidazole derivative of sodium glycinate contribute toward such evolution of microscopic air cells throughout the froth, and the retention of advantageous small cell size during the curing to an elastomeric cellular cushion.

Each colloidal particle of elastomer dispersed in the aqueous latex has a propensity to sorb the fatty acid chains of the surfactant, and to expose to the aqueous system the water solubilizing moiety of the surfactant molecule. As the air is entrained into the latex to generate a froth and as the froth is heated into a cured dry cushion, the three surfactants help to maintain the advantageous small size of the air cells and minimize the merging of small cells into larger cells.

The frothing agent is an amber colored liquid having a Brookfield RVF viscosity (# spindle at 20 RPM) of from about 25 to 150 centipoise. The liquid weighs about 8.73 pounds per gallon and has a pH of 7±0.0.5. The frothing agent is particularly useful as the frothing agent for a method of preparing carpet backing comprising the steps of modifying a styrene-butadiene-unsaturated acid-unsaturated amide elastomer latex by adding thereto calcium carbonate filler, curing agents, and a frothing agent, whipping air into the thus modified latex to provide a froth, depositing said froth on an advancing backing of a carpet to provide a froth coated carpet, advancing said froth coated carpet through a heated curing zone to volatilize water and steam therefrom and to provide a cellular cushioned elastomer backing for said carpet.

EXAMPLE 2

A frothing agent is prepared in accordance with the present invention using Sipex LM brand (Alcolac Chemical Corporation, Baltimore, Md. 21226, trademark owner) of an aqueous solution of magnesium lauryl sulfate, plus Liponic EG-1 brand (Lipo Chemicals Inc., New York, N.Y. 10016, trademark owner) of Glycereth-26, an alkoxylated glycerol having an average of from about 20 to 30 ethoxy groups per glycerol group, and MJ-113A brand (Warren Chemical Co., Bowie, Md. 20715, trademark owner) of a derivative of sodium glycinate in which the nitrogen is a dihydroimidazole ring, said glycinic nitrogen also having an ethyhydroxy group, and the carbon between the two imidazole nitrogens having a fatty acid chain as its only carbon-carbon linkage. Said frothing agent has a composition corresponding to that of Example 1.

A carpet backing is prepared by using SKD-1123 brand (Arco Polymers, Philadelphia, Pa. 19101, trademark owner) as the synthetic latex derived from emulsion polymerization of styrene, butadiene, a monomer having one polymerizable olefinic group and two groups of the class consisting of amide, imide, ester and carboxylic acid groups, and an unsaturated amide. Finely divided synthetic precipitated calcium carbonate is employed as the filler, the proportions being as in Example 1. The composition is modified by the addition of conventional curing agents. The frothing agent (2.5% of latex) is the last modifier added to the composition prior to its being well mixed. The thus prepared composition is directed to an aereator injecting high pressure air into the composition to whip it into a froth. Such froth is deposited on the back of a carpet, and directed through a curing zone in which the steam and water escape by permeation through the cell walls to provide a cured cellular elastomeric cushion. The advantageous results are generally the same as with Example 1. Thus the carpet backing has a small cell size, a high enough tensile strength to anchor loops, and sufficient resiliency to be effective as a cushioning type of carpet backing.

EXAMPLE 3

Emulsion polymerization features are utilized for the polymerization of a mixture of butadiene, styrene, an unsaturated amide and an unsaturated compound having two groups of the class consisting of carboxylic acid groups and the esters, amides, imides, and related derivatives of carboxylic acid groups. Because the polymer contains amide groups and related carboxylic acid groups, the colloidal dispersion of the polymer in an aqueous system is more readily achieved. The rubber latex solution includes the emulsifying agents and related modifiers conventionally employed in a synthetic latex solution. It is optional whether the described latex is employed or whether SKD-1123, marketed by Arco Polymers, as previously explained, is employed.

In preparing a suitable backing for upholstery, a composition can be prepared consisting of:

|  | parts by weight |
| --- | --- |
| latex | 200 |
| water | 195 |
| powdered talc filler | 150 |
| casein | 2.5 |
| polyacrylate thickener | 20 |
| frothing agent | 1.6 |

It is optional whether the frothing agent described in connection with Example 1 or the frothing agent described in connection with Example 2 is employed, the two being equivalent. Air is whipped into the composition to provide a froth having very tiny gas cells. The froth is deposited on the back of an advancing upholstery fabric and then subjected to heat to cure the froth into an elastic, resilient cushioning layer which also adequately anchors the back of the loops of the pile fabric. The froth coated upholstery fabric advances into a curing oven in which the temperature is high enough to volatilize the water as steam and to permit the diffusion of the steam from one open cell to another open cell, and thus to the atmosphere. The cured cushioning backing for the upholstery fabric has the strength for anchoring the loops of the upholstery fabric.

EXAMPLE 4

An upholstery fabric backing was prepared following the general procedure of Example 3, but substituting various types of fillers. It was established that good results could be obtained using calcium carbonate, alumina trihydrate, talc or mixtures of such fillers as the inorganic modifier for the elastomeric composition.

EXAMPLE 5

An elastomeric froth suitable for a coating and anchoring composition was prepared by adding about five parts of polyacrylate thickener to a latex of the type described in Example 3, such as SKD-1123, there being 200 parts by weight of the latex solution. To this composition there was added 1.6 parts of the latex frothing agent of Example 1 or Example 2. The effectiveness of the anchoring for flock was enhanced by the addition of 0.01 part of silicone anti-foaming agent. The composition thus prepared had a formula as indicated:

|  | parts by weight |
|---|---|
| latex | 200 |
| defoamer | 0.01 |
| latex frothing agent | 1.6 |
| polyacrylate thickener | 5.0 |

The composition was subjected to a whipping action for preparing a froth which was distributed on an advancing strip to provide a layer of adhesive on the advancing strip. Electrostatic forces were employed for parallel alignment of the short textile fibers which were partly embedded and rooted in the froth so that the upstanding textile fibers presented the appearance of a velour. The thus prepared composite of textile fabrics and anchoring adhesive were directed into a curing zone in which the water component of the latex was converted to steam and evaporated through the open pore structure of the cellular elastomer so that the product leaving the curing zone was a strip having the flocked fibers effectively anchored thereto by the cellular elastomer derived from SKD-1123 latex.

EXAMPLE 6

A froth composition suitable for anchoring a flock was prepared using a latex formed by the copolymerization of butadiene, styrene, and an unsaturated compound having two groups of the class consisting of carboxylic acid, esters, amides and imides and related carboxylic derivatives, the fourth component of the monomeric mixture being an unsaturated amide. A type of latex marketed by Arco Polymers, known as Dylex 1084 functions equivalently to the described latex resulting from such copolymerization. A formulation consisting of:

|  | parts by weight |
|---|---|
| Dylex 1084 | 100 |
| TMC-1 defoamer | 0.05 |
| frothing agent of Example 1 or 2 | 0.5 |
| acrylate thickener type Acryson ASE-60 | 5.0 |

Using the Brookfield instrument for measuring the rheology, it was noted that the viscosity at 6 rpm was 52,000 centipoise, at 12 rpm was 27,000 centipoise, at 30 rpm was 13,800 centipoise, and at 60 rpm was 8,050 centipoise. Using a 5 oz. cup, the cup weight was 160.2 g. The stirrers were rotated to whip air into the mixture and the excess was removed so that after one minute of whipping, the weight of 5 ounces of froth was 76.7. After 3 minutes of whipping, the weight of the 5 ounce volume cup of froth was 36.2 g. After 5 minutes of whipping air into the froth, the 5 ounce cup contained only 29.2 g.

Such data indicated that the froth had the properties desired in a latex froth contemplated for use as an anchoring adhesive for flocking. A series of tests were made to establish the stability of the mixture prior to the air entrainment. Although there was a slight increase in the viscosity of the mixture containing the frothing agent prior to any air injection, the stability of the solution was shown to be quite satisfactory during the period of at least ten days.

EXAMPLE 7

By a series of tests it is shown that advantages are achieved by using as the frothing agent a composition corresponding to a latex frothing agent useful for entraining air in a froth of aqueous latex dispersion of an elastomer, said aqueous solution containing about 70% water and about 25% magnesium di(lauryl sulfate), about 2.5% polyalkoxyglycerol having about eight alkoxy groups per hydroxyl group and about 2.5% of a quaternary dihydroimidazole derivative, there being a fatty acid carbon chain attached as the only carbon-carbon linkage for the carbon between the nitrogens of the dihydroimidazole ring, the quaternary nitrogen partaking of the nature of a quaternary sodium glycinate having at such quaternary nitrogen both an alkhydroxy group and said dihydroimidazole ring.

The invention claimed is:

1. A latex frothing agent useful for entraining air in a froth of aqueous latex dispersion of an elastomer, said latex frothing agent consisting essentially of an aqueous solution containing about 70% water and about 25% magnesium di(lauryl sulfate), about 2.5% polyalkoxyglycerol having about eight alkoxy groups per hydroxyl group and about 2.5% of a quaternary dihydroimidazole derivative, there being a fatty acid carbon chain attached as the only carbon-carbon linkage for the carbon between the nitrogens of the dihydroimidazole ring, the quaternary nitrogen partaking of the nature of a quaternary sodium glycinate having at such quaternary nitrogen both an alkhydroxy group and said dihydroimidazole ring.

2. The frothing agent of claim 1 in which the fatty acid chain is the fatty acid chain derived from coconut oil.

* * * * *

UNITED STATES PATENT OFFICE
CERTIFICATE OF CORRECTION

Patent No. 4,102,808    Dated July 25, 1978

Inventor(s) Daniel Charles Straka

It is certified that error appears in the above-identified patent and that said Letters Patent are hereby corrected as shown below:

The term of this patent subsequent to September 20, 1994 has been disclaimed.

Signed and Sealed this

Fifth Day of December 1978

[SEAL]

Attest:

RUTH C. MASON
Attesting Officer

DONALD W. BANNER
Commissioner of Patents and Trademarks